United States Patent [19]

Lefevre et al.

[11] 4,169,122
[45] Sep. 25, 1979

[54] METHOD OF FORMING STARTING TAILS FOR FILM ROLLS

[75] Inventors: Lloyd E. Lefevre, Bay City; Mark A. Wegenka, Midland, both of Mich.

[73] Assignee: The Dow Chemical Company, Midland, Mich.

[21] Appl. No.: 849,137

[22] Filed: Nov. 7, 1977

[51] Int. Cl.$^2$ .................. B29C 17/14; B29C 17/00; B65H 19/26; B65H 37/00
[52] U.S. Cl. .................. 264/160; 206/389; 242/56 R; 264/163; 264/284; 425/304
[58] Field of Search ............ 264/148, 151, 160, 163, 264/284; 242/56 R; 83/15, 16, 170, 171; 425/304, 294, 385

[56] References Cited

U.S. PATENT DOCUMENTS

| | | | |
|---|---|---|---|
| 3,365,992 | 1/1968 | Oreher | 242/56 R |
| 3,567,552 | 3/1971 | Heuff et al. | 242/56 R |
| 3,741,850 | 6/1973 | Highfield et al. | 83/171 |
| 4,064,776 | 12/1977 | Walitalo | 83/171 |

FOREIGN PATENT DOCUMENTS

51-62862  5/1976  Japan ........................ 425/294

*Primary Examiner*—James B. Lowe
*Attorney, Agent, or Firm*—Lloyd E. Hessenaur, Jr.

[57] ABSTRACT

A method of affecting the tail end of a roll of plastic film to render it readily identifiable and easy to grasp and start without tearing the film web into strips. The tail end of the film is embossed on-line as it is separated and about to be wound up on a roll core. The method is accomplished by securing the tail end between a heated surface on the upstream side of a knife on a cut-off roll and a lifting and embossment mechanism to provide a wide embossment across the tail end of the film at about the time it is severed from the film stock. The method produces a novel puckered tail, particularly for highly oriented films where tension is relieved while the tail end is still heated.

7 Claims, 11 Drawing Figures

METHOD OF FORMING STARTING TAILS FOR FILM ROLLS

FIELD OF THE INVENTION

The present invention relates generally to the field of roll tail embossing of film so that the end of the roll can be readily started and unwound without tearing. More particularly, the invention deals with a method for obtaining novel roll tail embossing on line with inexpensive equipment adaptation. Equipment synchronization to accomplish embossing at normal operating speed ranges is avoided by the invention.

DESCRIPTION OF THE PRIOR ART

The need for simply finding the end of the roll of plastic film and starting to unwind it without tearing has been well recognized for some time, particularly with films which have considerable cling, as exemplified in saran films commonly used as household wraps. Roll tail identification by embossing the tail end of each roll has been known. The most common technique prior to the present invention involved heating apparatus located in the line considerably prior to film cut-off whereby bars would join on opposite sides of the film precisely where the film would be cut later on in the line to form the end of the roll. This film was embossed while under tension, thereby avoiding shrinkage. This required excessively complicated equipment so that full synchronization of the embossing apparatus with the speed of the film making line was accomplished. Otherwise the embossment would occur at other than the tail end. This was particularly difficult at the high line speeds commonly employed in film manufacture. Such commercially available embossing units commonly cost hundreds of thousands of dollars, installed. Another method is to tuck in a tail. However, if the tuck is too long or not tucked in far enough and the roll contains wrinkles, the tail is not readily visible or is difficult to see and use, and hard to start. Other tail starting mechanisms such as using a spray-on material, like starch dust, or waxing the tail end have not been as successful as providing an embossed tail.

The ideal solution would be to provide a better embossment and to do so inexpensively, at normal operating speed ranges.

SUMMARY OF THE INVENTION

In view of the foregoing factors and conditions, it is among the objects of the present invention to provide an inexpensive system capable of providing roll tail embossment simply and accurately without requiring equipment synchronization, and at the same time to provide a roll of film with a novel tail end which can be readily identified by the film user and the film easily started from the roll.

According to the present invention a strip heater is simply and inexpensively attached to an existing slitter/winder at a location immediately adjacent the film cutter so that the tail end is readily embossed exactly where desired, adjacent the film cut. Synchronizing operations which involve timers and skill in film handling are thereby avoided. In addition, the process of the apparatus of the present invention is designed to render crystalline films amorphous thereby disorienting film in the area of contact which softens the film making it adhere to itself on winding. Later, upon recrystallization the embossed area shrinks, hardens and curls away from the roll forming a handle for the customer to grasp for removing the film. Crystalline films are formed of polymers and copolymers which exist on the form of crystalline particles below their melting point. Generally, they exhibit sharp reductions in volume as they reach their melting point. Crystalline films also often have varying amounts of amorphous phase polymers (generally having a physical state as a glossy solid) associated with their crystalline structure.

Specifically, a heater means is attached to the cut-off adjacent the cut-off blade. A section of bed roll plate is adapted to allow the brushes to be brought into communication with the blade as it cuts the film. On a signal the brushes bring the cut tail end of the film into contact with the heater means on the cut off roll which permits embossment of the tail of the film. In one embodiment the brushes will be adequate to provide an embossment. In another embodiment a plate adjacent the brushes moves the film towards the heater and provides the desired embossment. Other variations may be possible.

The features of the present invention which are believed to be novel are set forth with particularity in the appended claims. The present invention, both as to its organization and method steps, together with further objects and advantages thereof, may best be understood by reference to the following description, taken in connection with the accompanying drawings in which like reference characters refer to like elements in the several views.

DESCRIPTION OF THE PREFERRED EMBODIMENTS

Figure 1:
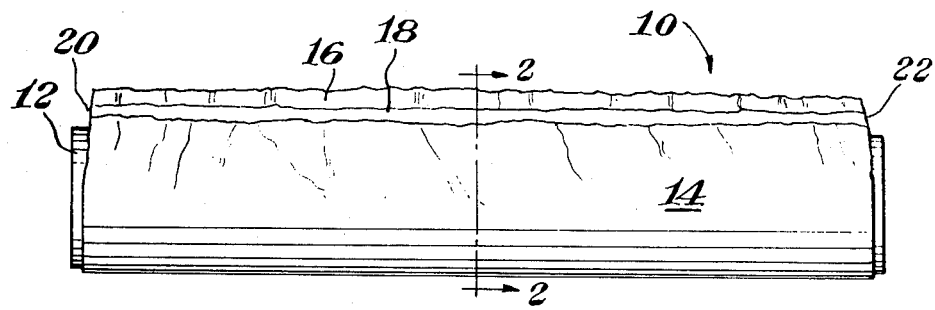
FIG. 1 is a front elevational view of a roll of film having its tail end embossed according to the principles of the present invention.
Figure 2:
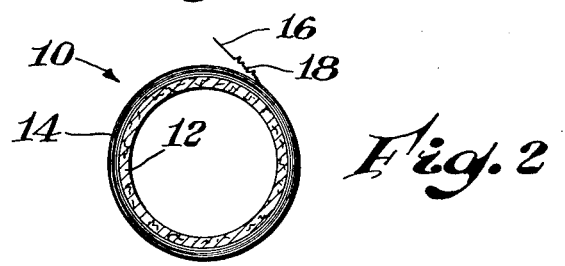
FIG. 2 is a cross section of the roll of film of FIG. 1 taken along the reference line 2—2 thereof.

Referring more particularly to FIGS. 1 and 2, there is shown a roll of film 10 comprising a paper board core 12 and a film 14 wrapped about the core. Film 14 has a roll end or tail 16 which includes a puckered section 18 along its width. The ends 20 and 22 of the tail 16 are shriveled to the point where the width of the roll of film at the tail is less than that for the main body of the film downwardly from the tail. The tail 16 is shown in more detail in FIG. 3 whereby the cross section of the film shows severe undulations such as 24 and 26 extending in one direction, and severe undulations such as typified at 27 and 28 extending generally in the opposite direction so that the puckering is considerably pronounced. This rather heavily undulated puckered embossed tail 16 interrupts the otherwise smooth surface of the film which provides the tack or cling between the film layers. Thus the tack is disturbed and a free end or handle is provided by the puckered tail 16. The film tail, besides being puckered or wrinkled and reduced in width is disoriented, stiffer and thicker than the film stock 14, which aids in preventing slit propagation which otherwise is a common problem in highly oriented films, for example.

Sufficient heat is applied to the tail, as described in more detail hereinafter, to render the tail of a crystalline film amorphous. That is, the film loses its shrink energy and recrystalizes without substantial orientation, the relaxation of the shrink energy resulting in the puckering of the tail 16.

Figure 3:
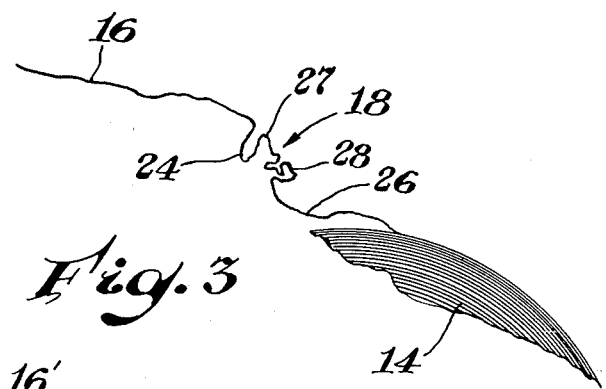
FIG. 3 is a greatly enlarged cross sectional view of the end of the film as it leaves the roll of FIG. 2.
Figure 4:
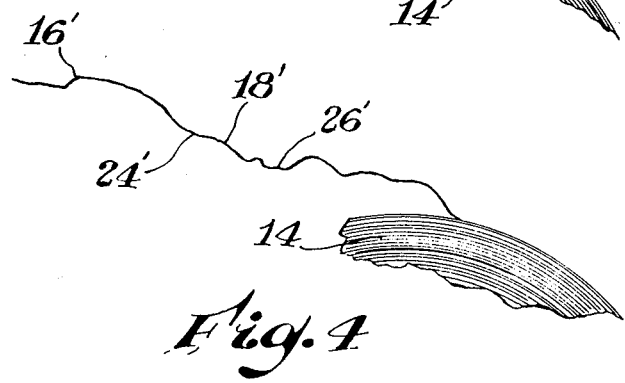
FIG. 4 is a view like FIG. 3, only of a modified end of a film showing the embossed characteristics thereof.

In many cases the degree of puckering shown in FIG. 3 is not required because the tack characteristics of a particular film may not be as great as that present with other films, or possibly for other resins. In such case a lesser degree of heat application or heat contact with the tail is provided and a resulting tail can be as illustrated in FIG. 4. Here the undulations and wrinkles are not as severe, yet there is still some disorientation, a toughness and an embossment identification which renders the tail effective for the purposes of providing a free starting easily identifiable handle for the consumer to unwrap the film.

Figure 5:
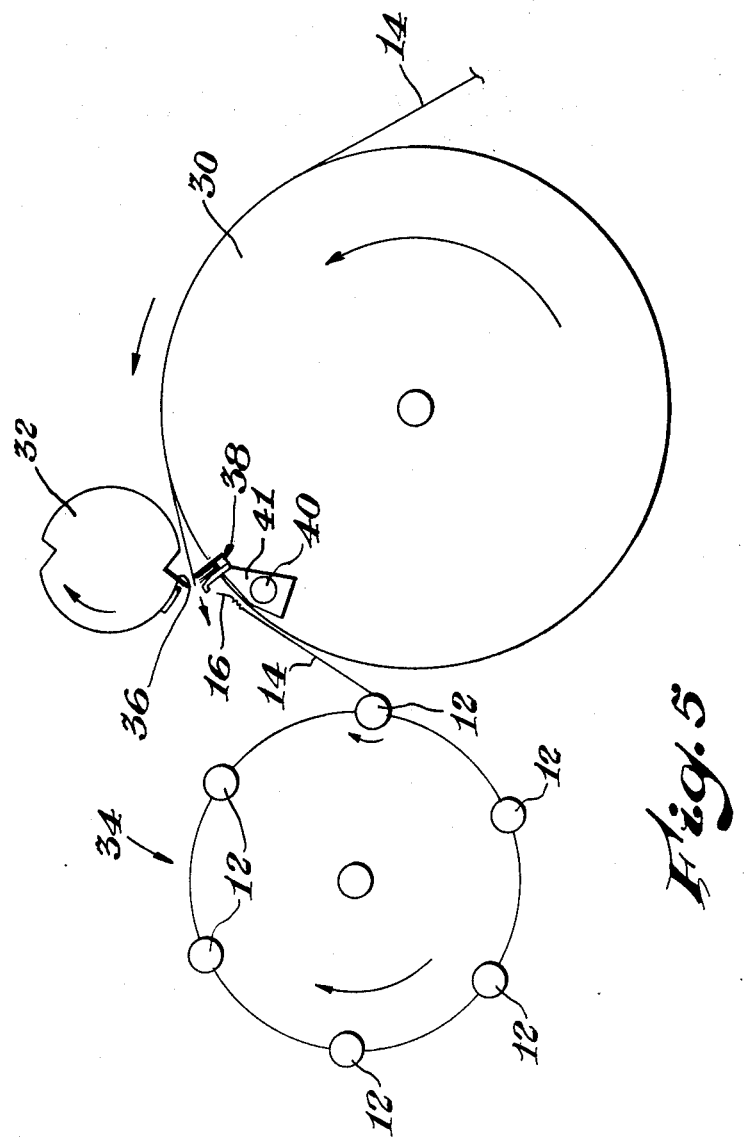
FIG. 5 is a schematic representation of a preferred embodiment of the apparatus to emboss the film of FIG. 1 in accordance with the principles of the present invention.

The process of the present invention can be carried out by the apparatus schematically illustrated in FIG. 5. The basic hardware comprises a main bed roll 30, a cut-off roll 32 and a group of winding mandrels 34 carrying cores 12. After being manufactured by conventional methods, the film 14 passes over the main bed roll 30 and under cut-off roll 32. As the film passes by cut-off roll 32, it is severed in lengths sufficient for one roll of film, and thereafter wound upon each of the individual cores 12 which are rotating clock-wise. The pick-up of the film 14 onto each of the individual rolls 12 is accomplished in a conventional manner well known to those in the art. Also, in a traditional manner the main bed roll will rotate in a direction opposite from that of the cut-off roll and the winding mandrel, in this case counter clockwise, in order to feed the film onto the winding mandrels and permit the cut-off roll to sever the film adequately.

The cut-off roll 32 carries a blade 36. A brush mechanism or lifting means 38 supported within bed roll 30 pushes the film up from the bed roll. As this occurs the blade penetrates the brush mechanism and as it does so severs the film to provide tail 16 for the end of the film which is wrapped upon the roll core 12. The brush mechanism 38 is pivotly carried upon lever 41 turned by pivot shaft 40 so that it is raised upwardly when cutting is to occur but is otherwise recessed into the main bed roll for those revolutions of the bed roll when cutting does not occur. When the required length of film passes the bed roll for a given roll of film, a signal activates the pivot shaft 40 to raise the brush mechanism to effect cutting of the film by blade 36.

Figure 6:
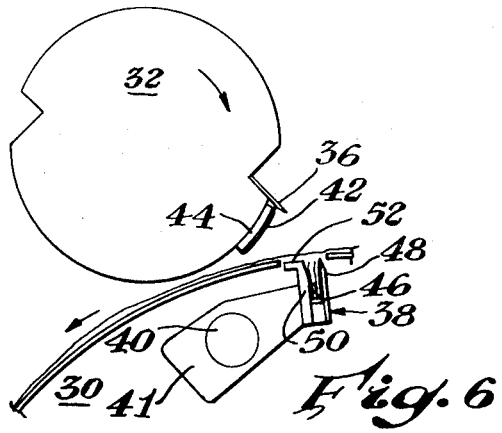
FIGS. 6 through 10 are enlarged partial sectional views showing in sequence the film and an enlarged partial sectional view of the bed roll and cut-off roll of FIG. 5, cooperating to effect cutting of the film and embossing of the film in accordance with the principles of the present invention to provide the roll tail end shown in FIG. 3, for example.
Figure 7:
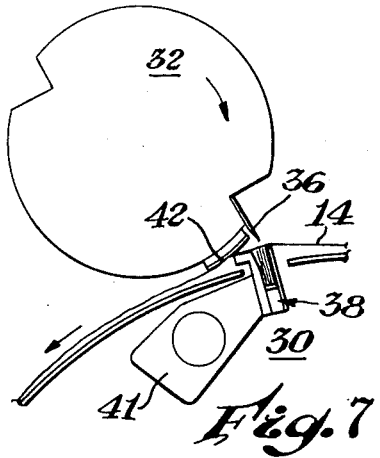
Figure 8:
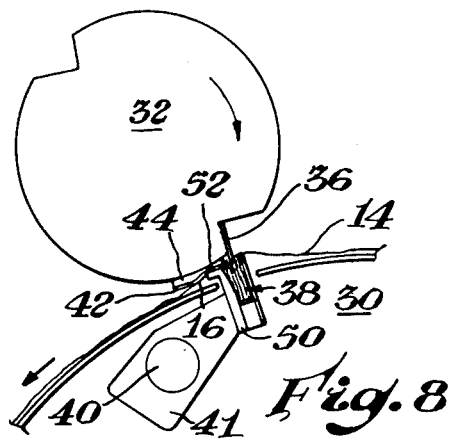
Figure 9:
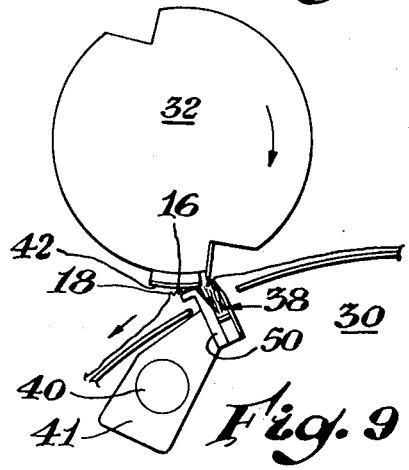

A more detailed showing of the cut-off roll 32 and the brush mechanism 38 is illustrated in FIG. 6. In this embodiment, an L-shaped lifting bar 50 forms part of the pivoted brush mechanism 38, and provides a lifting face 52 which actually engages the film. Back of blade 36 is a heating means 42 which can comprise a flexible electrical tape, for example, which itself can be supported upon a base or pad 44 of silastic resilient foam or the like. As illustrated in FIGS. 7 and 8, for example, the face 52 can have a grooved or other desired pattern to also effect a patterned embossment on the tail 16 of the film. When the bar 50 engages and compresses against the flexible heater and resilient base as illustrated in FIG. 8 at about the time the blade 36 cuts the film 14, the compression of the bar face 52 against the flexible heater 42 and resilient base 44 results in a tight fit at the time the heat and pressure is being applied so that embossment of the film readily occurs at the tail 16, as illustrated in FIG. 9. As the tail 16 leaves the main bed roll, as illustrated in FIG. 10, it is taken up on a roll core 12 upon the winding mandrel 34 as shown in FIG. 5.

Figure 10:
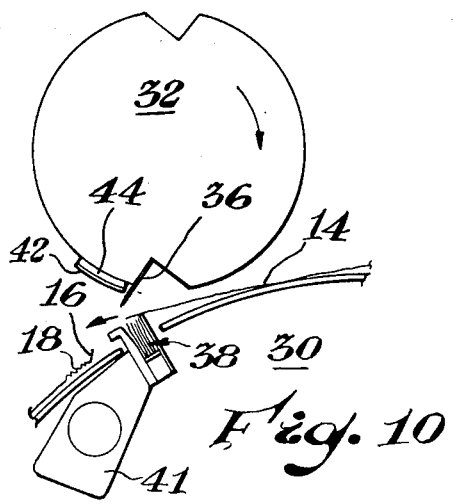

The puckered end 18 of the tail 16 shown in FIG. 10 can be substantially like that shown in FIG. 3, for example, to give the desired tail handle heretofore described. The degree of heat necessary for a particular film to provide relaxation of orientation depends on the film itself and the contact time with the heat source. While the film may still be uncut and thereby under tension while heat commences to be applied, the continuing application of heat and the residual heat contained within the film as tension is relieved upon cutting will permit such relaxation of orientation to provide the puckered tail. Where a crystalline film like saran is used, the film recrystallizes after cooling occurs.

The process of the invention thus includes the steps of feeding the film stock across a bed roll, before being wound upon a core, raising the film from the bed roll, cutting the film as it is raised, and applying heat and pressure to the film adjacent the section thereof being cut to form the tail end of the film, the heat and pressure being sufficient to impress an embossment upon the tail end of the film. Where an oriented crystalline film is involved, the heat being supplied to the film should also be sufficient to permit relaxation of the orientation of the tail end of the film after the tension on the film is relieved by the cutting of the film to allow the tail end to pucker.

Figure 11:
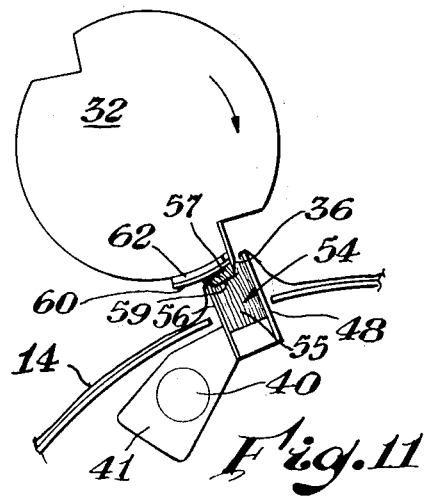
FIG. 11 is an enlarged partial sectional view like FIG. 8 only of a modified form of bed roll which can provide the roll tail end shown in FIG. 4, for example.

A modified form of brush mechanism is shown in FIG. 11. Modified brush mechanism 54, shown in an upright position similar to that of FIG. 7 of the preceding example, has essentially the same parts as the mechanism of FIG. 7 except that the bar 56, replacing bar 50, has no lateral face or surface 52 as does bar 50 and is cut down from the height of the bar 48 to permit the brush ends 57 of brush 55 to bend downwardly to assist embossment. Bar 56 is preferably spaced further from bar 48 than was bar 50 of the embodiment of FIG. 6 so that the part 59 of the brush forward of the blade 36 is wider to more effectively emboss tail end 16. Brush 55 might be twice as wide as brush 46, for example. An alternate embodiment, not shown, could have a sponge in place of most of width part 59 of the brush forward of where the blade intersects the brush if a sponge material having sufficient heat tolerance and body strength for repeated usage is employed. The embossment of FIG. 4 with less deep undulations would be more typical of the type of embossment which one would obtain with the modified brush mechanism 54. For many materials and applications, the embossment in FIG. 4 may be adequate.

The specific embodiment of FIG. 11 shows a metal strip heater 60 on cut-off roll 32, which is supported on a silicone, asbestos or equivalent insulation layer 62.

The metal strip heater need not be particularly flexible as in this embodiment the brush ends 57 provide the necessary flexibility to secure the tail against the heater providing sufficient heat to the film to effect embossment.

The basic main bed roll, cut-off roll and winding mandrel can be those supplied by Paper Converting Machine Company, Green Bay, Wis., as 72" Slitter/Rewinder, Series 150, for example, only modified with the brush mechanisms and heater means suggested by the present invention. Heater 42 can be a Watlow Silicone Rubber tape heater and heater 60 can be a Watlow Metal Strip heater, both manufactured by Watlow Electric Manufacturing Co. of St. Louis, Mo. The strip heater, for example, could be 2 inches wide×72 inches long at 12 watts/inch$^2$, 0–120 volts output. The tape heater would be adequate for running the customary saran films at 400 feet per minute while metal strip heaters will operate with saran films at speeds in excess of 1000 feet per minute, for example. At these faster speeds, the strip heater 60 acting against brush part 59, provides good film contact. The voltage can be controlled, for example, by a Tempco adjustable voltage control mechanism providing 25 amps available from Tempco Electric Heater Co. of Schiller Park, Ill. Brush 55, for example, can be $\frac{5}{8}$" to $1\frac{1}{2}$" wide by 72" long, and work quite effectively. Blade 36 should clear the main bed roll by, for example, 0.03". Face 52 of bar 50 can be adequate at $\frac{3}{8}$" or more, for example, on a 72" film width.

EXAMPLE I

The present invention was run successfully with a saran film using an embodiment similar to that of FIG. 6. The saran film was made from Dow Polymer B1550 comprising a vinylidene/vinyl chloride copolymer containing about 11 to 12% vinyl chloride. The film thickness was about $\frac{1}{2}$ mil. It had a heat shrink capacity of about 20% when subjected to a temperature of about 212° F. for a period of one minute, and a Mettler Cling Value of about $3\frac{1}{2}$ to $4\frac{1}{2}$ grams pulling force. A Watlow tape heater, of the type described earlier, was obtained having a reasonably uniform temperature across its width. The heater was adjusted on its silastic foam backing pad to make the pad parallel to the heater all across the width of the roll. Fifty foot rolls of about $11\frac{1}{2}$" in width were run at about 400 feet per minute with a heater temperature of about 410° F. Successful puckered embossment was obtained comparable to that shown in FIG. 3. The resultant film tail end had a width (as viewed laterally across FIG. 1) of about $10\frac{3}{8}$", indicating a lateral shrinkage of about 10%. The embossment extended about three-eighths of an inch into the film from the leading edge of the tail end.

EXAMPLE II

The present invention was also run with a saran film like that of Example I only using an embodiment similar to that of FIG. 11. A Watlow metal strip heater like that previously described was maintained at a temperature of about 410° F. at a speed of about 600 feet per minute. In this case the total time of heating of the film was about 0.008 seconds. At the rate of 200 feet per minute, the total time of heating would be about 0.025 seconds and at 1000 feet per minute, about 0.005 seconds. The resultant film roll, which was basically about $11\frac{1}{2}$" in width and 50 feet long, had a tail end with an embossment comparable to that of FIG. 4, the embossed tail end having a width (as viewed laterally across FIG. 1) of about $10\frac{1}{4}$", indicating a width shrinkage of about 10%. The embossment was about three-quarters of an inch into the film from the leading edge of the tail end.

EXAMPLE III

The present invention was also practiced using an embodiment similar to that of FIG. 11 only with a $\frac{1}{2}$ mil thick polyethylene film. The film was a blend of about 85% low density polyethylene, designation 461 by The Dow Chemical Company, and about 15% high density polyethylene, Dow designation 10062, and had a heat shrink capacity of about 1 to 2% when subjected to a temperature of about 212° F. for a period of one minute. Cling was not particularly significant. The metal strip heater was maintained at a temperature of about 300° F. and the film was run at a line speed of about 200 feet per minute. There was little puckering seen, the film width at the embossment being reduced from 12 inches to about $11\frac{3}{4}$", but the film was embossed for ease of identification and did curl somewhat away from the roll. The embossment extended about $\frac{3}{8}$" in from the leading edge of the tail end.

It is believed that the embossing and puckering effect and width decrease of the film as shown in FIGS. 3 and 4 results from the relaxation of orientation caused by providing sufficient heat to cause such relaxation in the film tail as film tension is released. Previous to the present invention, embossing was normally done substantially prior to cut-off of the film, and therefore while the film was still under tension. This required registering the embossing step so that it would be located at the actual tail to be cut off later down the line, with the result that the film has no chance to relax its orientation at the time of embossment. The present invention does the embossing at the time of the cut, so that the tension is released and puckering is allowed to occur. This is significant as compared to other embossments which merely mark the film or make it dull at the tail so that it is easier to identify but does not provide a significant handle. Accordingly, the present invention makes it possible to have a shrink film tail which is disoriented, and is stiffer, thicker and tougher than the main film stock. The slit propagation problem is considerably improved at the tail. The heat renders the normally crystalline polymer amorphous thereby losing its shrink energy, which thereafter recrystallizes without orientation to provide the tail handle to facilitate starting of the roll. By having control of the tail end, right at the cut, simple mechanisms can be employed to effect the embossment.

Other modifications of the present invention are possible and can still be within the scope of the appended claims, and it should be understood that other variations and modifications of the particular structures shown, the methods taught, the apparatus employed and the film materials used are possible without affecting the scope and protection herein afforded.

What is claimed is:

1. A method for forming a starting tail for a thermoplastic roll of film on-line as the film is being wrapped on a roll core, said method comprising the steps of feeding the film across a bed roll, raising the film from the bed roll, cutting the film as it is raised, and applying heat and pressure to the film surface adjacent the section thereof being cut to form the tail end of the film, said heat and pressure being sufficient to undulate, shrink or otherwise emboss the tail end of the film.

2. The method of claim 1 wherein the thermoplastic film is a biaxially oriented crystalline film, the heat applied being sufficient to permit relaxation of orientation of the tail end of the film when tension is relieved by the cutting of the tail end from the film stock.

3. The method of claim 2 wherein said tail end of the film after being heated is permitted to cool from a substantially amorphous state back to its crystalline state.

4. The method of claim 1 wherein the film is a polyolefinic film.

5. The method of claim 1 wherein the film is a vinylidene chloride/vinyl chloride copolymer film.

6. The method of claim 1 wherein said heat and pressure is sufficient to reduce the width at the tail end of the film to less than that of the main body of the film.

7. The method of claim 1 wherein said heat and pressure is applied at least to the surface of the film facing away from the bed roll.

* * * * *